Feb. 4, 1930. A. H. TASHJIAN 1,745,729
STRUCTURAL ELEMENT AND STRUCTURE COMPOSED THEREOF
Filed July 3, 1925 2 Sheets-Sheet 1
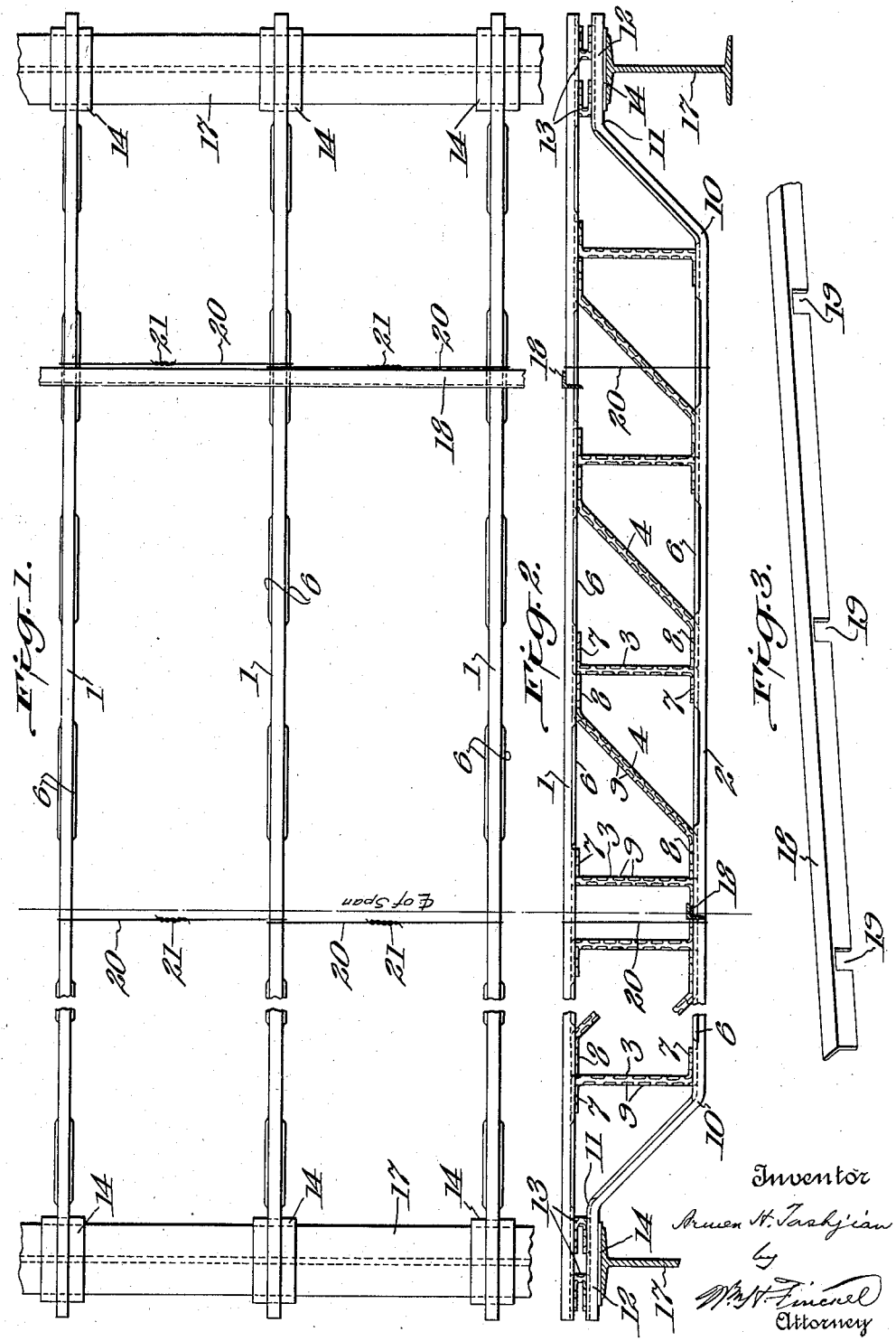

Feb. 4, 1930.　　　A. H. TASHJIAN　　　1,745,729
STRUCTURAL ELEMENT AND STRUCTURE COMPOSED THEREOF
Filed July 3, 1925　　2 Sheets-Sheet 2
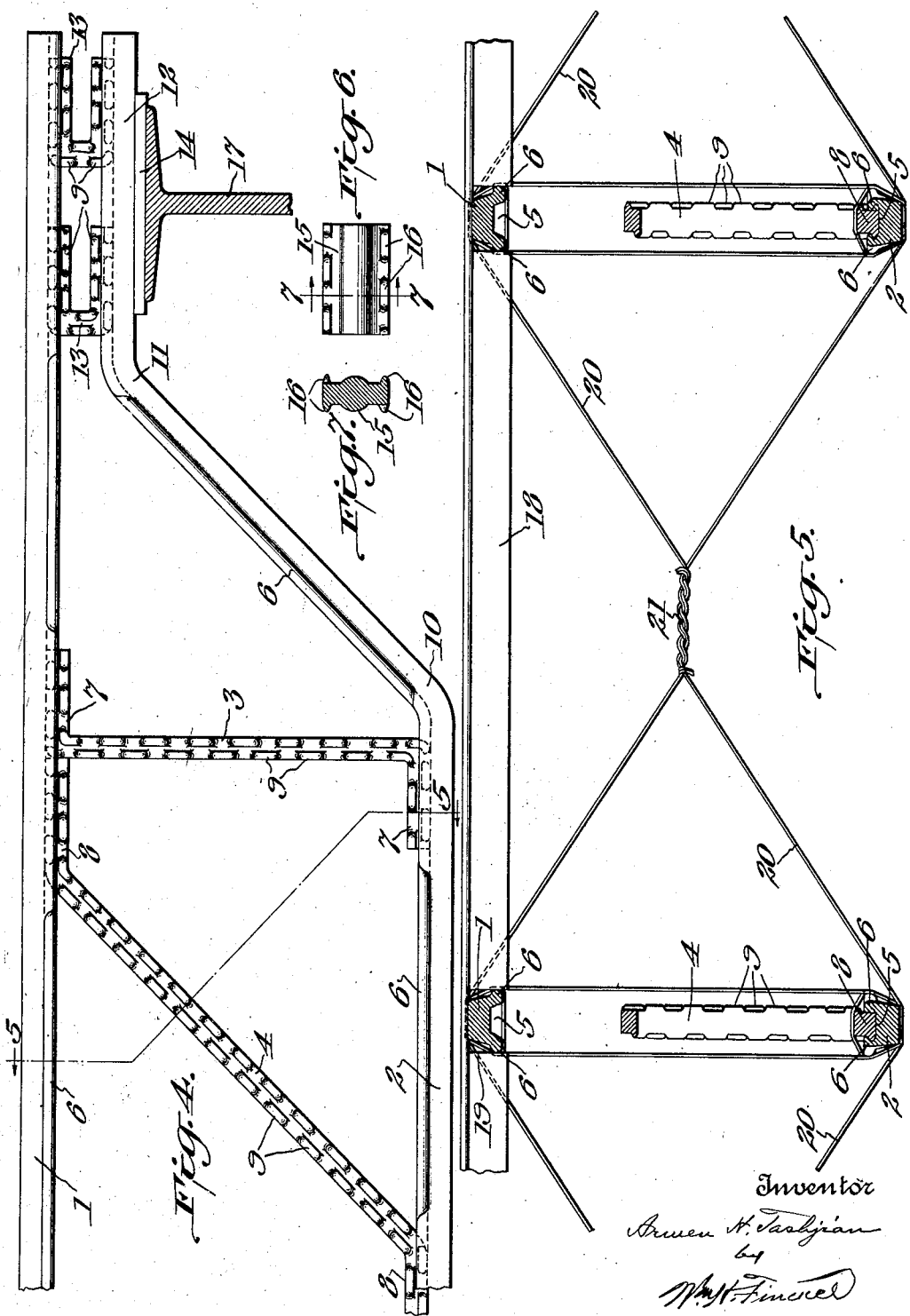

Patented Feb. 4, 1930

1,745,729

UNITED STATES PATENT OFFICE

ARMEN H. TASHJIAN, OF CLEVELAND, OHIO

STRUCTURAL ELEMENT AND STRUCTURE COMPOSED THEREOF

Application filed July 3, 1925. Serial No. 41,413.

This invention relates to a structural element, such as a joist, of a particular construction as hereinafter pointed out, and to a structure, such as the supporting framework for a floor or roof, composed of these structural elements.

One object of the invention is to produce a joist or the like structural element of relatively light truss formation, and composed of a plurality of similar elements united without the aid of riveting or welding and relatively rigid.

Another object of the invention is to provide a joist or the like structural element, as above described, having bearing portions at its ends, these bearing portions forming an integral part of the elements comprising the joist, whereby loads placed upon the joist are communicated directly from the member thereof to which they are applied to all of the other members of the joist without liability of fracture or slippage.

A still further object of the invention is to provide a structure, such as the supporting framework for a floor or roof, composed of structural elements or joists of the type described, wherein means are provided for properly relatively positioning such elements or joists and for tying them together into a unitary rigid structure.

The invention consists, essentially, in a joist, or the like structural element, having a top chord member and a bottom chord member, and web members interposed between said chords in truss formation and rigidly bounded thereto, the ends of the bottom chord member being bent upwardly into proximity to the ends of the top chord member and the bent-up ends of the bottom chord member having portions lying in parallelism with the top chord member and rigidly secured thereto to form a bearing portion for the joist; the means for securing the ends of the chord members at the bearing portions being of such a nature as to prevent slippage between the chord members. And the invention consists further, in a structure composed of such structural elements, and in means for positioning and tying such elements in predetermined relationship, as I will proceed now to explain and finally claim.

In the accompanying drawings illustrating the invention, in the several figures of which like parts are similarly designated, Figure 1 is a top plan view of a portion of a structure composed of elements or joists embodying my invention. Fig. 2 is a sectional side elevation thereof. Fig. 3 is a fragmentary perspective view, upon a larger scale, of a spacing angle member. Fig. 4 is a detail side elevation, upon a larger scale, of one end of a joist constructed in accordance with my invention. Fig. 5 is a section taken on the line 5—5 of Fig. 4 showing the means for spacing and bridging a plurality of joists. Fig. 6 is a side elevation of a modified form of member for uniting the chord members at their bearing portions. Fig. 7 is a section taken on the line 7—7, Fig. 6.

Referring particularly to Figs. 2, 4 and 5, my structural elements or joists comprise a top chord member 1, a bottom chord member 2, vertical web members 3, and diagonal web members 4. The chord members 1 and 2 are formed of rolled steel bars having their inner faces provided with channels 5 flanked by lips or flanges 6 (Fig. 5). The web members 3 and 4 are provided with feet 7 and 8 respectively which, when in assembled position, engage with the channels 5 of the chord members 1 and 2, and the lateral faces of the web members 3 and 4 are provided with knobs or humps 9 which, when the lips 6 of the chord members are clinched upon the feet 7 and 8, will imbed themselves in the lips and form a rigid nonslipping connection between the web members and the chord members.

It will be noted that the inner faces of the lips 6 are preferably plain, as distinguished from the recessed flanges of the chord members of my Patent No. 1,013,698, dated January 2, 1912. Thus, during the clinching of the lips 6 upon the feet 7 and 8, the knobs or humps 9 will form their own recesses in the lips 6, the metal of the lips flowing in between the humps or knobs.

As will be seen, particularly by reference to Figs. 2 and 4, the feet 8 of the diagonal web members abut against the vertical web members 3 and the clinching of the lips 6 of the chord members upon them is thus aided in maintaining the proper predetermined relationship between the chord members and the web members.

The bottom chord member 2 is bent upwardly adjacent to its ends, as at 10, and is then given a reverse bend, as at 11, to form a bearing portion 12 at each end of the structural element, these bearing portions 12 lying in parallelism with the ends of the top chord member 1 and rigidly connected therewith and appropriately spaced therefrom by means of U-shaped spacing and connecting members 13 formed of material similar to that of which the web members are formed and provided with similar knobs upon which the lips 6 of the chord members are clinched to provide a rigid non-shifting connection between the ends of the chord members. If desired, bearing plates 14 may be welded or otherwise affixed to the bearing portions 12 of the bottom chord members 2 to form a broader seat for the bearing portions than is provided by the width of the chord members themselves, but the addition of these plates 14 is not essential.

By forming the bearings for the elements by the bending up of the bottom chord member, I provide an exceedingly strong construction, for the reason that all loads distributed from the top chord member 1 through the web members 3 and 4 to the bottom chord member 2 are therethrough directly transferred to the bearings upon which the ends of the elements or joists are supported.

It will be noted also, that by my construction, I dispense entirely with riveting and welding operations in the formation of my elements, and thereby obviate the necessity for the punching or drilling of holes for the reception of rivets or the heating of the metal of the elements incident to the ordinary welding operation, thus avoiding any operations upon the elements or joists which would tend to weaken them.

In place of the U-shaped members 13 which are used to space and connect the ends of the chord members, I may use members of the type illustrated in Figs. 6 and 7, and which comprise solid blocks 15 provided upon their edges with knobs or humps 16, similar in form and arrangement to the knobs or humps 9 of the web members 3 and 4 and cooperating with the lips of the chord members in like manner.

In forming a structure of my elements, such as a supporting structure for a floor or roof, I merely arrange a plurality of my elements or joists in proper predetermined spaced relation with their bearing portions 12 or bearing plates 14 resting upon suitable supports provided for them and for cooperation with which they are fabricated, such as the I-beams 17, and then position upon the top and bottom chords of the elements, spacing bars or angles 18, shown in detail in Fig. 3, provided with notches 19 which engage with the sides of the chord members to maintain the elements in proper spaced relation.

With the structure thus assembled, I may, if desired, and preferably do, provide wire bridging 20 between the several elements, as shown particularly in Fig. 5. This wire bridging merely consists of pairs of wires looped around the elements and having their ends brought together and twisted into a permanent connection 21 intermediate the several joists, as shown in Fig. 1.

The spacing bars or angles 18 and the wire bridging 20 may be arranged at such intervals throughout the span of the elements as may be deemed advisable and as may be required by the loads which the structure is designed to carry.

Various changes are contemplated as within the spirit of the invention and the scope of the following claims.

What I claim is:—

1. In a structural element, two cooperating members arranged to be connected one to the other, one of said members provided with offstanding knobs and the other member provided with deformable flanges, the member having knobs arranged to be positioned with its knobs in cooperative relation to said flanges, and said flanges adapted to be clinched upon said member, the clinching operation acting to embed said knobs in said flanges to form a rigid connection between said members.

2. In a structural element, two cooperating members arranged to be connected one to the other, one of said members provided with offstanding spaced knobs and the other member provided with deformable flanges, the member having knobs arranged to be positioned with its knobs in cooperative relation to said flanges, and the said flanges adapted to be clinched upon said member, the clinching operation acting to embed said knobs in said flanges and to cause the material of said flanges to flow into the spaces between said knobs to form a rigid connection between said members.

3. In a structural element, two cooperating members arranged to be connected one to the other, one of said members provided with offstanding knobs and the other member being channelled and provided with deformable flanges, the member having knobs arranged to be positioned in the channel of the channelled member with its knobs in cooperative relation to said flanges, and said flanges adapted to be clinched upon said member, the clinching operation acting to embed said knobs in said flanges to form a rigid connection between said members.

4. In a structural element, two cooperating members arranged to be connected one to the other, one of said members provided with laterally offstanding knobs and the other member being channelled and provided with deformable flanges, the member having knobs arranged to be positioned in the channel of the channelled member with its knobs in cooperative relation to said flanges, and said flanges adapted to be clinched upon said member, the clinching operation acting to embed said knobs in said flanges to form a rigid connection between said members.

5. In a structural element, two cooperating members arranged to be connected one to the other, one of said members provided with offstanding knobs and the other member provided with plain surfaced deformable flanges, the member having knobs arranged to be positioned with its knobs in cooperative relation to said flanges, and said flanges adapted to be clinched upon said member, the clinching operation acting to embed said knobs in said flanges whereby said knobs form their own sockets in the flanges to provide a rigid connection between said members.

In testimony whereof I have hereunto set my hand this 2nd day of July, A. D. 1925.

ARMEN H. TASHJIAN.